C. J. MYERS.
ELECTRIC CURRENT CHANGING MEANS.
APPLICATION FILED APR. 4, 1918.

1,424,256.

Patented Aug. 1, 1922.

WITNESS.
Walter H. Troemel.

INVENTOR
Clyde J. Myers
BY
Bradford & Doolittle
ATTORNEYS

UNITED STATES PATENT OFFICE.

CLYDE J. MYERS, OF INDIANAPOLIS, INDIANA, ASSIGNOR TO SWARTZ ELECTRIC COMPANY, OF INDIANAPOLIS, INDIANA, A CORPORATION OF INDIANA.

ELECTRIC-CURRENT-CHANGING MEANS.

1,424,256.   Specification of Letters Patent.   Patented Aug. 1, 1922.

Application filed April 4, 1918. Serial No. 226,642.

*To all whom it may concern:*

Be it known that I, CLYDE J. MYERS, a citizen of the United States, residing at Indianapolis, Marion County, and State of Indiana, have invented and discovered certain new and useful Improvements in Electric-Current-Changing Means, of which the following is a specification.

My invention relates to current changing means, and its object is to provide means whereby an alternating current may be produced from a direct current source without the use of the usual rotary converter.

The arrangement is adapted to produce an alternating current of varying voltage.

An embodiment of my invention is illustrated in the accompanying drawings showing the same applied to a direct current dynamo and its commutator.

Figure 1:
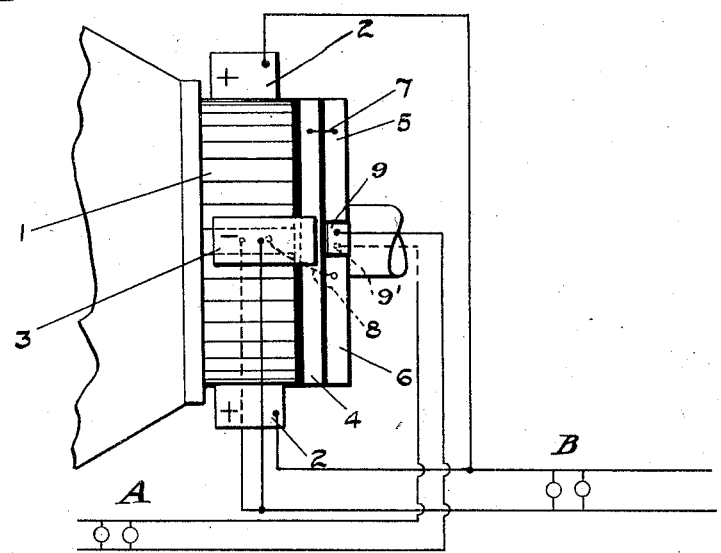
Figure 2:
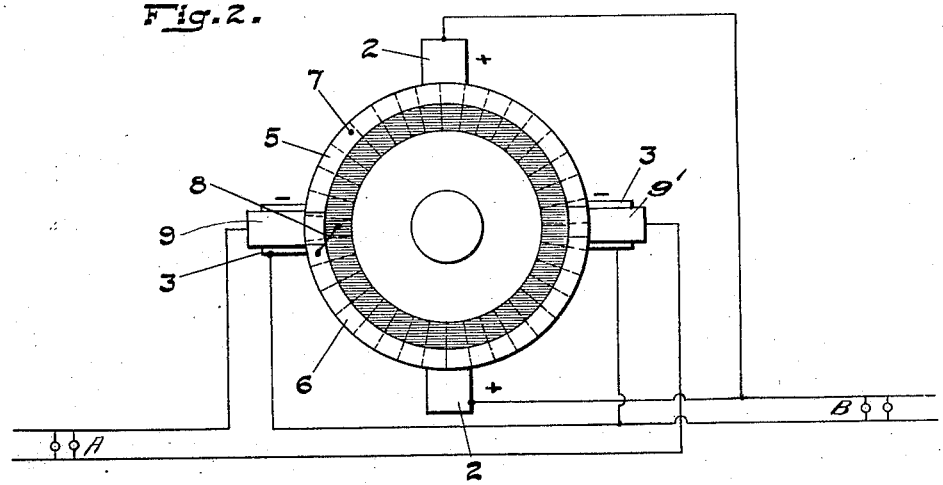

In these drawings, Figure 1 is a side view in elevation of a direct current dynamo showing the invention applied thereto, and Figure 2, an end view.

Referring to the drawings 1 indicates a commutator having segments engaged by positive brushes 2 and negative brushes 3. A slip ring 4 revolves with the commutator, being fixed to the commutator shaft and insulated from the shaft and commutator. One of the commutator brushes, as for example brush 3 at the left-hand side of Figure 2 is elongated so as to bear on the slip ring. Adjacent the slip ring 4 is a second ring comprising two segments 5 and 6 revolving with the commutator and insulated from each other and from the commutator shaft and slip ring 4. The segment 5 is shown as connected to slip ring 4 at 7 while segment 6 is shown as connected to a segment of the commutator at 8.

Brushes 9 and 9′ bear at opposite sides on the segment ring (or second commutator), the various brushes being so arranged in relation to the generator terminals which make contact with the commutator 1 as to have zero wave strength at the time the contacts 9 and 9′ are changing from one segment to the other.

In the operation of the device the commutator 1 acts in the ordinary manner to change the alternating current from the generator to a direct current passing from brushes 2—2 to a circuit B including electric lights or other electrically operated devices or mechanisms and it passes back through the other side of the circuit and through the negative brushes 3, 3. At the elongated negative brush on the left side of Figure 2 the current divides and passes partly to the commutator and partly to the slip ring 4. That part of the current which goes to the slip ring passes thence through connection 7 to segment 5 and from the segment to that one of the brushes 9, 9′ which is in contact with said segment. Assuming that brush 9′ is in contact with segment 5 current will pass to the circuit A at the left of Figure 2 thence by way of the electric lights or other device or instrumentalities to the other side of the circuit, back to the brush 9, thence to the segment 6, connector 8 and so to the commutator.

When the brush 9, however, is in contact with segment 5 the current will pass from the commutator to slip ring 4, segment 5, brush 9, left-hand side of circuit A through the circuit to the brush 9′, segment 6, connector 8 and so to the commutator. It will be seen that by the change of poles due to the rotation of the segmental slip ring the direct current in circuit B will be changed to an alternating current in the circuit A.

Having thus described my invention, what I claim is:—

1. In combination, an armature, a continuous ring and a segmental ring on the armature shaft, a commutator for the armature having a brush contacting with the first ring and connections from a segment of the second ring to the first ring and from another segment to a segment of the commutator, substantially as set forth.

2. In combination, an armature, a commutator, terminals therefor, a circuit and means to produce an alternating current therein comprising a segment ring on the shaft and connections from a segment of the ring to one of said terminals, and from another segment to a segment of the commutator, substantially as set forth.

3. In combination, an armature, a commutator terminals therefor, a circuit and means to produce an alternating current therein comprising a segment ring on the shaft and connections from a segment of the ring to one of said terminals and from another segment to a segment of the commutator, the terminals engaging the segment ring being so arranged relative to those of the commutator as to have zero wave strength when changing from one segment to another.

4. In combination with a source of current, current changing means comprising in combination with one set of generator terminals, a current carrying element which makes circuit with said terminals, an additional terminal contact with which the said element also makes contact and alternately with the respective generator terminals, and a second current carrying element revoluble against the additional terminal contacts and changing the polarity thereof, said second element being separated into two parts insulated from one another and one part of which is connected to the first element and the other part to said source of current, the collecting contacts being so arranged relative to the generator terminals making contact with the first element as to have zero wave strength at the time the two collecting contacts are changing their relation with the second carrying element.

5. In combination with a direct current dynamo, a commutator therefor, two sets of terminals, a rotative current carrying element which makes circuit with one set of generator terminals and alternately with an additional terminal of which the polarity is changed, a second rotative current carrying element for effecting said change of polarity, said second element being separated into two parts insulated from one another and one part of which is connected to the first element and the other part to the commutator segment, the additional terminal constituting a collecting contact and being so arranged in relation to the generator terminals making contact with the first element as to have zero wave strength at the time the collecting contact is changing its relation with the segment connected to the second current carrying element.

In witness whereof, I have hereunto set my hand and seal at Indianapolis this 23rd day of March, A. D. nineteen hundred and eighteen.

CLYDE J. MYERS. [L. S.]

Witnesses:
C. K. BURDICK,
W. B. SEFTON.